(No Model.)
C. E. MACARTHY.
Cotton Press.
No. 242,667. Patented June 7, 1881.
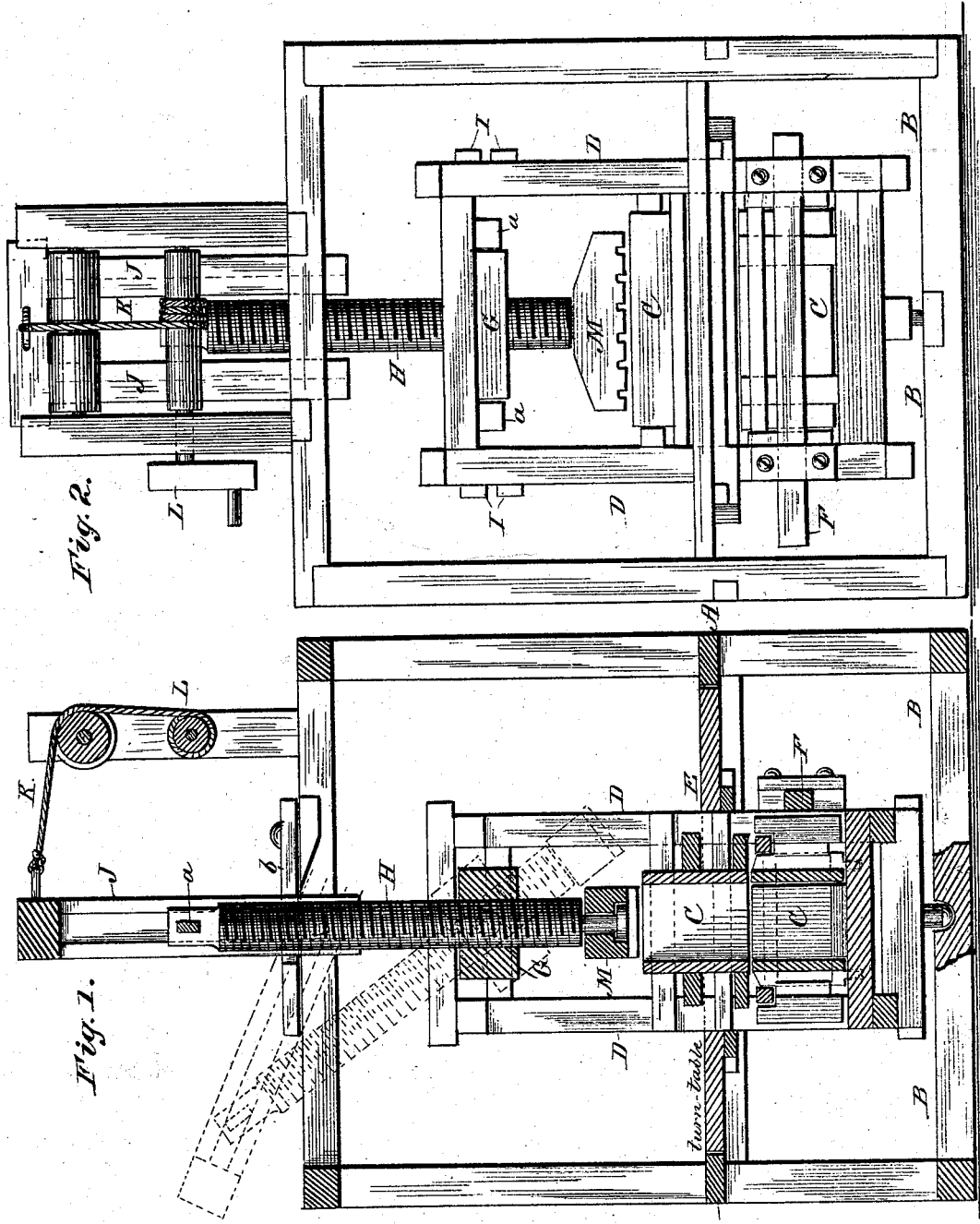
WITNESSES:
P. C. Dieterich.
Edw. W. Byrn.
INVENTOR:
C. E. Macarthy
BY
ATTORNEYS.

UNITED STATES PATENT OFFICE.

CHARLES E. MACARTHY, OF FORSYTH, GEORGIA.

COTTON-PRESS.

SPECIFICATION forming part of Letters Patent No. 242,667, dated June 7, 1881.

Application filed April 18, 1881. (No model.)

*To all whom it may concern:*

Be it known that I, CHARLES E. MACARTHY, of Forsyth, in the county of Monroe and State of Georgia, have invented a new and Improved Cotton-Press; and I do hereby declare that the following is a full, clear, and exact description of the same, reference being had to the accompanying drawings, forming part of this specification, in which—

Figure 1 is a vertical central section, and Fig. 2 is a side elevation at right angles to the view shown in Fig. 1.

My invention relates to certain improvements in presses for baling cotton or other analogous material of that type in which the box is made to revolve, and the follower is forced down in the same by the action of a screw-stem.

My invention consists in the peculiar means for throwing the screw-stem and follower to one side of the mouth of the box, to permit the packer to have free access to the same to pack the cotton therein.

It also consists in constructing the rotary box with a turn-table, which turns in a circular hole in the floor, flush with the same, to facilitate the packing of the box, while the connections for rotating the box and releasing the bale are below, all as hereinafter more fully described.

In the drawings, A represents a floor, and B the lower part or basement of a house or other frame-work.

C is the press-box, which, at its lower end, is stepped upon a central pivot in the lower timbers, so as to revolve about its center in a horizontal plane. This box is contained within a rectangular frame-work, D, which extends up through and above the floor A, and which box, at about the middle of its height, is provided with a turn-table, E, which rests flush in a circular hole in the floor A and guides the upper part of the box in its revolution.

Beneath the floor A the frame-work of the box is provided with one or more levers, F, for rotating the box, and at this point also the box is provided with side doors for tying and releasing the bale.

The object of the turn-table is to give standing room close up to the box, so as to facilitate packing the cotton in the same.

In cross-pieces *a a* in the upper part of the box-frame is supported a nut, G, having a female screw adapted to receive the vertical screw-stem H. This screw-stem is swiveled at its lower end in the follower-block M, and does not rotate, being held against rotation by devices above, as will be described farther along.

The screw-nut G, through which the screw-stem passes, is provided at opposite ends with journals, which are pivoted in bearings in the cross-pieces *a a*, so that the stem and follower may be thrown into an inclined position, as shown in dotted lines in Fig. 1, to remove the follower from the mouth of the box and allow the packer to have sufficient room for packing the cotton in the box.

In constructing the press, the screw-stem and its nut I prefer to make of metal, and when thus made of metal I propose to make the nut relatively small and journal its ends in the cross-pieces *a a*. In some instances, however, I may make both the nut and screw-stem of wood, and when thus constructed the nut is to be made larger, and its ends extend to the outer frame-work of the box, where they find a bearing in the pieces I, which allow it the same adjustment to an inclined position.

The upper end of the screw-stem is provided with a cross-pin or head-block, *a*, that rests in grooves in a guide-frame, J, which grooves and cross-pin keep the screw-stem from turning, while the nut and follower both revolve with the press-box. While the screw-stem does not revolve, however, it will be seen that it is drawn down by the revolution of the nut, and the follower is made to compress the cotton in the box into a bale.

The guide-frame J is pivoted at its lower end to the top timbers of the frame-work, and its normal position is vertical. To permit the screw-stem, however, to be thrown into the inclined position, this frame is made capable of being swung also into an inclined position. A rope, K, and windlass L serve to raise and lower this guide-frame, and when the latter is in its vertical position a pair of hooks or catches, *b b*, serve to retain it in that position.

Having thus described my invention, what I claim as new is—

1. The combination, with a floor, A, of a press-box having a turn-table fitting flush in a circular hole in said floor, and having its levers and doors below said floor and its mouth above the same, substantially as and for the purpose described.

2. The combination, with the rotary press-box, its follower, and screw-stem, of a guiding-frame for the upper end of the screw-stem, made adjustable to an inclined position, substantially as and for the purpose described.

C. E. MACARTHY.

Witnesses:
CHAS. A. PETTIT,
EDWD. W. BYRN.